United States Patent [19]
Harford et al.

[11] Patent Number: 5,337,091
[45] Date of Patent: Aug. 9, 1994

[54] VIDEO IF AMPLIFIER WITH AUXILIARY IF AMPLIFIER FOR INTERCARRIER SOUND & AFT

[75] Inventors: Jack R. Harford, Flemington; Alvin R. Balaban, Lebanon, both of N.J.

[73] Assignee: Samsung Electronics Co., Ltd., Kyungki, Rep. of Korea

[21] Appl. No.: 84,605

[22] Filed: Jul. 1, 1993

[51] Int. Cl.$^5$ .............................................. H04N 5/62
[52] U.S. Cl. .................................... 348/737; 348/735; 348/736
[58] Field of Search ...................... 358/195.1, 196, 197, 358/198; 348/735, 736, 737, 738; H04N 5/60, 5/62

[56] References Cited

U.S. PATENT DOCUMENTS 4,490,743 12/1984 Mycenek et al. .................... 358/197
4,599,652  7/1986 Carlson ............................ 358/195.1
5,177,613  1/1993 Rumreich et al. ................... 348/737

FOREIGN PATENT DOCUMENTS 0392772 10/1990 European Pat. Off. ........ H04N 5/62
2238213  5/1991 United Kingdom .......... H04N 5/60

Primary Examiner—Mark R. Powell
Assistant Examiner—Jeffrey S. Murrell
Attorney, Agent, or Firm—Sughrue, Mion, Zinn, Macpeak & Seas

[57] ABSTRACT

In a television receiver a downconverter responding to a selected television signal respectively supplies its first and second output signals as the input signals of first and second IF amplifiers, respectively. The downconverter includes a local oscillator for generating oscillations at a frequency controlled in response to the AFT signal. The first IF amplifier includes a first adjacent-channel sound carrier trap, in consequence whereof the first-IF-amplifier response is substantially reduced for the downconverted picture carrier, and an in-channel sound carrier trap. Responsive to the first-IF-amplifier response, a video detector generates a composite video signal in which sound beats are suppressed to relatively low level by the first adjacent-channel sound carrier trap. A second IF amplifier includes a second adjacent-channel sound carrier trap The second-IF-amplifier response, from which in-channel sound carrier is not trapped, is not as much reduced for the downconverted picture carrier by the second adjacent-channel sound carrier trap as the first-IF-amplifier response is by the first adjacent-channel sound carrier trap. From the second-IF-amplifier response, intercarrier detection circuitry detects an intercarrier-sound-IF response, which is amplified by an intercarrier sound-IF amplifier and then detected by an FM sound detector. Responsive to the second-IF-amplifier response, an automatic fine tuning (AFT) detector generates the AFT signal used to control the frequency of the oscillations generated by the local oscillator that the downconverter includes.

10 Claims, 7 Drawing Sheets

VIDEO IF AMPLIFIER WITH AUXILIARY IF AMPLIFIER FOR INTERCARRIER SOUND & AFT

The invention relates to intermediate-frequency (IF) amplifiers for television signal receivers, as incorporated in television sets or in television signal recording apparatus.

BACKGROUND OF THE INVENTION

A television signal receiver previously designed by one of the inventors, suitable for incorporation in a television set or video recorder, has a downconverter for responding to a selected television signal to generate intermediate frequencies including a downconverted amplitude-modulated video (or picture) carrier and a downconverted frequency-modulated audio (or sound) carrier. The downconverter includes a local oscillator for generating oscillations at a frequency controlled in response to an automatic fine tuning signal, which oscillations are heterodyned with the selected television signal to generate the intermediate frequencies. First and second output signals are taken from the downconverter by respective filters.

The filter producing the first output signal from the downconverter selects only the downconverted amplitude-modulated video carrier, suppressing the downconverted frequency-modulated audio carrier, and includes a deep adjacent-channel sound carrier trap. A first intermediate-frequency amplifier responds to the first downconverter output signal with a first-IF-amplifier response. A video detector generates a composite video signal responsive to the first-IF-amplifier response. This composite video signal is substantially free of sound beats therein, since the deep adjacent-channel sound carrier trap suppresses the adjacent-channel sound carrier in the IF supplied to the first IF amplifier. This first IF amplifier corresponds to the conventional video IF amplifier commonly referred to as a PIX IF amplifier.

In recent years, the level of the sound carrier has been reduced from the level in the original NTSC standard for television broadcasting, first by cable broadcasters to reduce-intrasystem interference and then by over-the-air broadcasters. This has tended to make the noise performance of intercarrier sound systems marginal, particularly in fringe-area reception of over-the-air television signals. The relatively deep adjacent-channel sound carrier trap for suppressing sound beats in the video detector response arising from an adjacent-channel sound carrier causes the first-IF-amplifier response to picture carrier to be reduced 6 dB or so, which results in reduced recovery of intercarrier sound intermediate frequencies therefrom. The peaking of the first-IF-amplifier response is for frequencies corresponding to midband video, so harmonic distortion of midband video signals generated in the intercarrier process are more likely to cause interference with an intercarrier sound IF signal supplied from the video detector to the FM sound detector, which interference disrupts proper limiting procedures, for example.

The pull-in range for the conventional automatic-fine-tuning (AFT) detector responding to the first-IF-amplifier response is designed to pull in from a mid-frequency of video IF, so the AFT will not erroneously lock to the adjacent-channel sound carrier. The deep adjacent-channel sound carrier rejection trap causes the first-IF-amplifier response to be sharply reduced with increasing frequency through the frequency region in which the downconverted sound carrier reposes, so the video carrier as translated to IF tends to be at a point in the IF amplifier response about −6 dB down from midchannel response. The reduced video carrier adversely affects the pull-in characteristics of the conventional automatic-fine-tuning (AFT) detector responding to the first-IF-amplifier response. Interfering carriers or sustained strong video signal components other than the video carrier, for which there are no rejection traps, tend to capture the AFT detector and cause mistuning. Using a separate intermediate-frequency amplifier for AFT is a possible way to obtain a better pull-in characteristics for the AFT detector, of course; but such practice ordinarily would be rejected in designing for the home market because of the additional receiver cost.

In the television signal receiver previously designed by one of the inventors, the filter producing the second output signal from the downconverter selects both the downconverted amplitude-modulated video carrier and the downconverted frequency-modulated audio carrier, and includes an adjacent-channel sound carrier trap that provides somewhat less rejection than the adjacent-channel sound carrier trap in the filter producing the first output signal from the downconverter and exhibits a less steep reduction with increasing frequency through the frequency region in which the downconverted sound carrier reposes. This somewhat less deep adjacent-channel sound carrier trap causes the second-IF-amplifier response to picture carrier to be reduced no more than 2 dB or so. The filter producing the second output signal from the downconverter in this previous design also includes a saddle between the video IF in-channel sound and picture carriers in which midband video IF is reduced by 10 dB or so, thereby eliminating the risk of doubled baseband video interfering with the sound IF signal.

Since the second-IF-amplifier response to picture carrier is reduced no more than 2 dB or so, the inventor attempted to obtain better pull-in characteristics for the AFT detector by using the second-IF-amplifier response as its input signal, rather than the first-IF-amplifier response. AFT detection is less affected by signals other than the video carrier, as desired, but the long-range pull-in characteristic on the low-frequency side is compromised if there is a saddle between the video IF in-channel sound and picture carriers in which midband video IF is reduced by 10 dB or so. Reducing the saddle so it is not more than 6 dB or so down reduces the likelihood of the AFT detector being captured by signals other than the video carrier without compromising its long-range pull-in characteristic on the low-frequency side. Even if the saddle is eliminated completely, the risk of doubled baseband video interfering with the sound IF signal is still lower than normally found in a PIX IF amplifier, since the video IF in-channel sound and picture carriers are stronger in the second-IF-amplifier response than in the first-IF-amplifier response. The benefits of both better sound and better AFT pull-in characteristics provide commercial justification for the cost of the second intermediate-frequency amplifier.

SUMMARY OF THE INVENTION

In a television receiver suitable for incorporation in a television set or video recorder that embodies the invention, in addition to a first intermediate-frequency amplifier used as a PIX IF amplifier for supplying amplified video intermediate frequencies for video detection, a second intermediate-frequency amplifier is used for supplying amplified video intermediate frequencies to a detector for developing intercarrier sound intermediate frequencies and to a detector for developing automatic fine tuning (AFT) signal. A downconverter responds to a selected television signal to supply first and second output signals each of which includes intermediate frequencies including a downconverted sound carrier and a downconverted picture carrier. The downconverter includes a local oscillator for generating oscillations at a frequency controlled in response to an automatic fine tuning signal. The first IF amplifier responds to a first output signal supplied by the downconverter with a first-IF-amplifier response. The first IF amplifier includes a first adjacent-channel sound carrier trap, in consequence whereof the first-IF-amplifier response is substantially reduced for the downconverted picture carrier, and an in-channel sound carrier trap. A video detector generates a composite video signal responsive to said first-IF-amplifier response, which composite video signal has sound beats therein suppressed to relatively low level by the first adjacent-channel sound carrier trap. A second intermediate-frequency amplifier, responds to the second output signal supplied by the downconverter with a second-IF-amplifier response from which said in-channel sound carrier is not trapped. The second intermediate-frequency amplifier includes a second adjacent-channel sound carrier trap in consequence whereof the second-IF-amplifier response is not as much reduced for the downconverted picture carrier as the first-IF-amplifier response is reduced for the downconverted picture carrier by the first adjacent-channel sound carrier trap. Intercarrier detection circuitry detects an intercarrier-sound-IF response from the second-IF-amplifier response, which intercarrier-sound-IF response is then amplified by an intercarrier sound intermediate-frequency amplifier. An FM sound detector generates a sound signal responsive to the amplified intercarrier-sound-IF signal. Responsive to the second-IF-amplifier response, an automatic fine tuning (AFT) detector generates the AFT signal used to control the frequency of the oscillations generated by the local oscillator that the downconverter includes.

DETAILED DESCRIPTION

Figure 1:
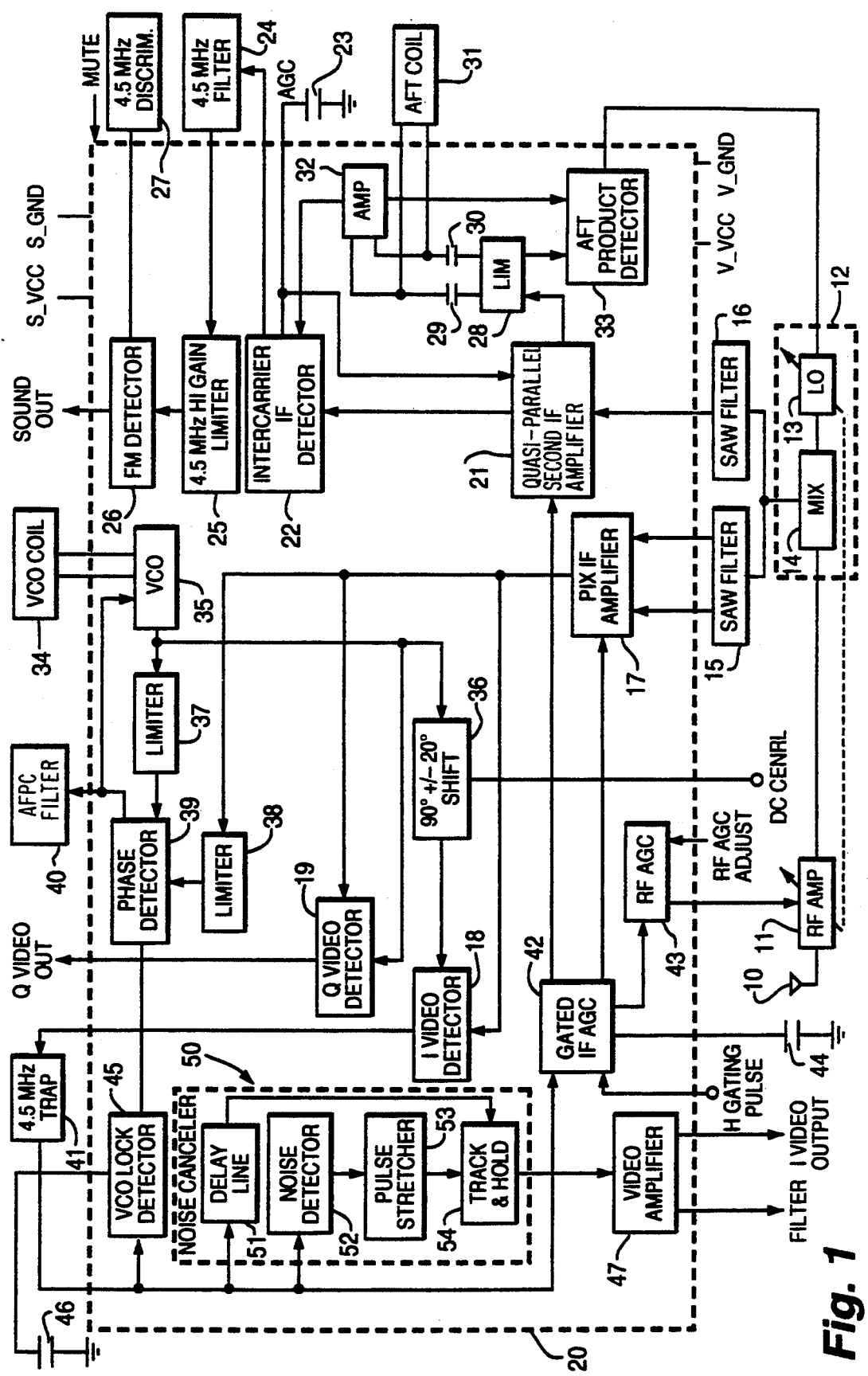
FIG. 1 is a schematic block diagram of a high-performance, intermediate-frequency integrated-circuit and peripheral circuitry for inclusion in television signal receiver, as embody the invention and can be incorporated into a television set or into television signal recording apparatus.

In FIG. 1 television signals, as may be received off-the-air by a television antenna 10 as shown, from a cable television system, or from a video tape recorder are supplied to a radio-frequency amplifier 11. The RF amplifier 11 supplies its amplified response to a selected television signal to a downconverter 12, which includes a local oscillator 13 tuned together with the RF amplifier 11 to select one television signal for mixing and a mixer 14 for mixing the selected RF signal with the oscillator 13 oscillations. The mixer 14 generates the intermediate frequencies and their image frequencies supplied to surface-acoustic-wave (SAW) filters 15 and 16.

The SAW filter 15 selects the intermediate frequencies from their image frequencies for application in balanced form to a first intermediate-frequency amplifier 17, the amplified first-IF-amplifier response from which is supplied to an in-phase synchronous video detector 18 and to a quadrature-phase synchronous video detector 19. Since the first IF amplifier 17 supplies amplified picture carrier and its amplitude-modulation sideband to the video detector 18 for detection to recover composite video signal, the amplifier 17 is also referred to as the "picture" IF amplifier or "PIX" IF amplifier. The synchronous video detectors 18, 19 and the first IF amplifier 17 are shown as being disposed within the confines of a monolithic integrated circuit 20 indicated by dashed line in FIG. 1. The SAW filter 15 has a conventional frequency response for television IF circuitry.

Figure 2:
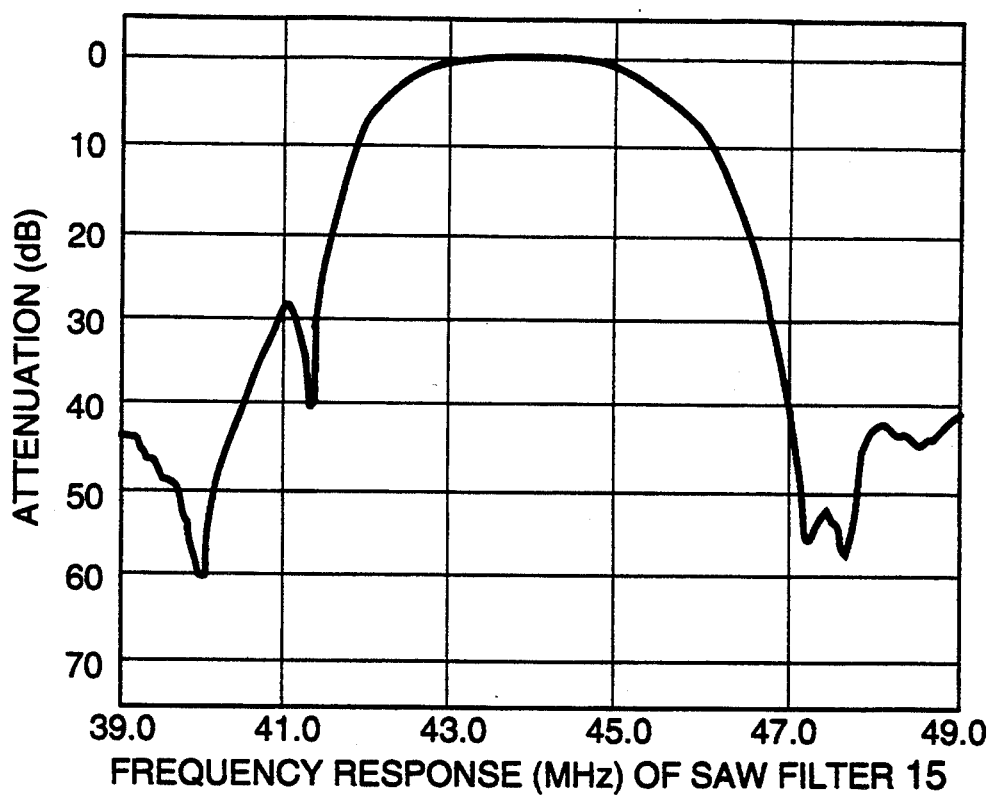
FIG. 2 is a plot of the response of the SAW filter preceding the first intermediate-frequency amplifier in the FIG. 1 apparatus.

FIG. 2 shows the SAW filter 15 response, presuming a 45.75 MHz video IF carrier frequency to be used, which response includes a relatively deep (>40 dB) trap at the adjacent-channel sound-carrier frequency of 47.25 MHz. This deep trap causes the response to the 45.75 MHz video IF carrier frequency to be located on a downward slope in frequency response, about 6 dB down. The response to the in-channel sound-carrier frequency of 41.25 MHz is reduced by about 30 dB. The SAW filter 15 exhibits linear-phase response throughout its passband. An example of a SAW filter exhibiting this type of response is the SAF45 MVB80Z manufactured by Murata Manufacturing Co., Ltd., in Erie, Pa.

The SAW filter 16 selects the intermediate frequencies generated by the mixer 14 from their image frequencies, for application in single-ended form to a second intermediate-frequency amplifier 21, referred to by in workers the art as a "quasi-parallel IF amplifier". The response characteristics of the filter 16 are chosen to facilitate the production of sound intermediate-frequency signals by the intercarrier method, so the second IF amplifier is labelled as the "intercarrier" IF amplifier in FIG. 1 of the drawing. The amplified second-IF-amplifier response from the second IF amplifier 21 is supplied to an exalted-carrier detector 22 included together with the amplifier 21 within the IC 20. The exalted-carrier detector 22 develops, heterodyning the amplitude-modulated video carrier and the frequency-modulated audio carrier as translated to IF, thereby to generate the sound IF signals as a frequency-modulated difference carrier (at 4.5 MHz for NTSC television signals). The response of the exalted-carrier detector 22 as supplied from a high-resistance source is lowpass filtered by a shunt capacitor 23 located off the IC 20, to develop an automatic gain control (AGC) signal for controlling the gain of the second intermediate-frequency amplifier 21. The response of the exalted-carrier detector 22, as supplied from another high-resistance source, is bandpass filtered by a 4.5 MHz center-frequency filter 24 located off the IC 20, to separate intercarrier-sound-intermediate-frequency signal for application to a limiter amplifier 25. The limiter amplifier 25 supplies limited intercarrier-sound IF signal to an FM detector, supplying an IC 20 sound output signal and being shown as a type that uses a 4.5 MHz discriminator circuit 27 located off the IC 20. The 4.5 MHz discriminator circuit 27 may comprise an LC circuit or a ceramic filter, to mention specific examples. The remaining portion 26 of the FM detector and the preceding limiter 25 are disposed within the IC 20. The IC 20 sound output signal may subsequently be amplified for application to a loudspeaker; or, alternatively, the sound output signal may subsequently be supplied to a stereophonic sound detector, and the detected left-channel and right-channel stereo sound signals derived from the IC 20 sound output signal are then amplified for application to respective loudspeakers.

The second-IF-amplifier response supplied from the intercarrier IF amplifier 21 is also supplied to a limiter 28 within the IC 20, which supplies limited second-IF-amplifier response in push-pull via capacitors 29 and 30 within the IC 20 to a coil 31 located off the IC 20. The coil 31 tunes against the capacitors 29 and 30 to provide nominally-quadrature-phase response to the carrier portion of the limited second-IF-amplifier response in balanced form, as input to a carrier-wave amplifier 32 within the IC 20. The capacitors 29 and 30 block DC from the limiter 28 to the amplifier 32, which supplies amplified carrier wave to the exalted-carrier detector 22 and to a phase detector 33, e.g., an AFT product detector 33, within the IC 20. The coil 31 has a high Q, so its tuning against the capacitors 29 and 30 provides a nominally quadrature phase shift that is in fact markedly frequency-dependent. The phase detector 33 measures the phasing of the carrier supplied by the amplifier 32, respective to the limited second-IF-amplifier response, for generating an automatic fine tuning (AFT) signal to control the frequency and phase of the local oscillator 13 in the downconverter 12.

Figure 3:
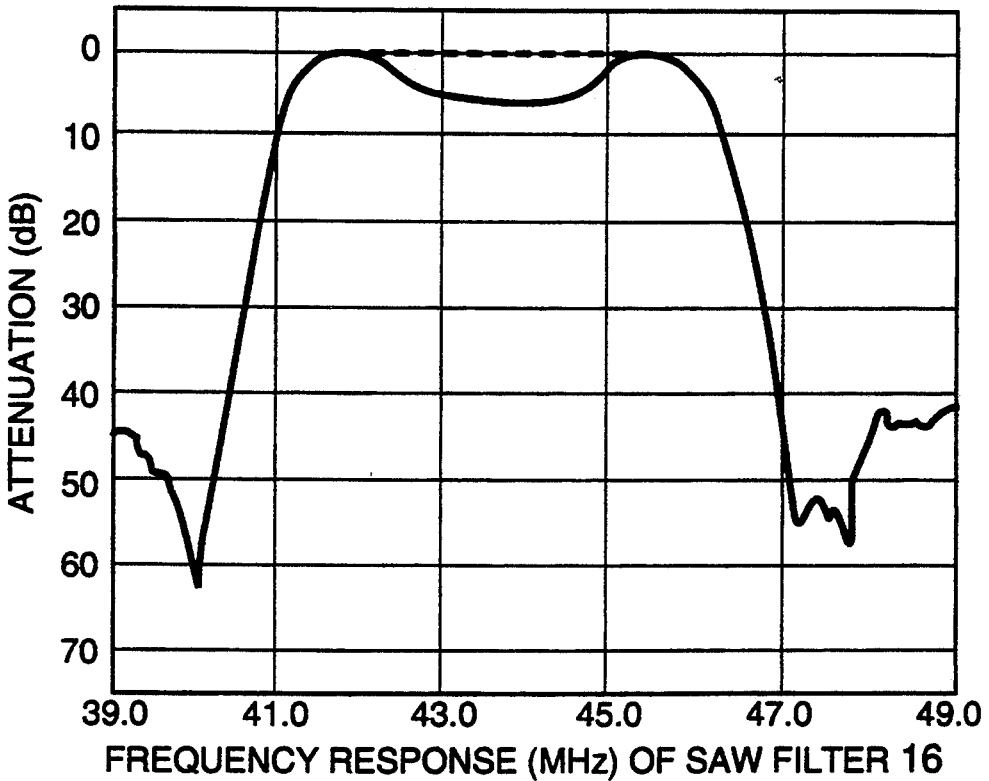
FIG. 3 is a plot of the response of the SAW filter preceding the second intermediate-frequency amplifier in the FIG. 1 apparatus.

FIG. 3 shows the SAW filter 16 response, presuming a 45.75 MHz video IF carrier frequency to be used, which response is double-humped in nature. A first of the humps has a peak at 41.25 MHz, the IF frequency to which the sound carrier is translated during the first detection procedure, which is a superheterodyning taking place in the mixer 14; and a second of the humps has a peak near 45.75 MHz, the IF frequency to which the picture carrier is translated during the first detection procedure. The SAW filter 16 response also includes a relatively deep (>40 dB) trap at the adjacent-channel sound-carrier frequency of 47.25 MHz. Even if the 45.75 MHz picture carrier is slightly higher in frequency than the peak of the second hump, so it is down by 2 dB or so, it will be bigger than the 41.25 MHz sound carrier. The picture carrier not being further down on the slope into the trap helps the AFT in distinguishing the picture carrier from in-channel and adjacent-channel sound carriers. The saddle between the humps at 41.25 MHz and near 45.75 MHz is only 6 dB down or so, maintaining AFT pull-in capability through this frequency range while offering reduction of sound beats generated when video baseband components near 2.25 MHz double to 4.5 MHz. Alternatively, the saddle can be eliminated completely so midband response is flat, as shown by the dotted line in FIG. 3; or the saddle can be reduced to be between the characteristics shown in FIG. 3.

The 41.25 MHz sound carrier in the signal the SAW filter 16 response supplies to the sound IF amplifier 21 should be at least 10 dB down from the 45.75 MHz picture carrier, so the AFT detector cannot be captured by the in-channel sound carrier. Since the sound carrier is about 18 dB down respective to the picture carrier in the television signal received at the RF amplifier 11 and downconverted in the mixer 12, the humps at 41.25 MHz and near 45.75 MHz in the SAW filter response to a flat bandsweep can be at substantially the same insertion loss level without risk of the AFT detector being captured by the in-channel sound carrier, even when adverse reception conditions tend to null the picture carrier respective to the sound carrier.

Referring back to FIG. 1, a voltage-controlled oscillator (VCO) includes a tank coil 34 located off the IC 20 and a remaining portion 35 located within the IC 20, which includes a tank capacitance and a regenerative amplifier. Oscillations nominally at 45.75 MHz picture carrier frequency, as supplied by this VCO, are applied directly as quadrature carrier to the quadrature-phase video detector 19 and via a de-controlled nominally-90° phase shifter 36 as in-phase carrier to the in-phase video detector 18. The oscillations from this VCO 34, 35 and the response of the first (PIX) IF amplifier 17 are respectively supplied to limiters 37 and 38; and the square-wave responses of the limiters 37 and 38 are supplied to a phase detector 39, which generates an automatic frequency and phase control (AFPC) voltage for the voltage-controlled oscillator 34, 35. An AFPC filter 40 located off the IC 20 provides smoothing to this AFPC voltage.

The video signal detected by the in-phase video detector 18 is passed through a 4.5 MHz sound IF trap filter 41 located off the IC 20. The video signal response of the sound IF trap filter 41 is supplied to gated IF-AGC circuitry 42 for developing automatic-gain-control (AGC) signals for application to the first (PIX) IF amplifier 17, to the second IF (intercarrier) amplifier 21 and to a Delayed RF-AGC circuit 43 for developing delayed automatic-gain-control (AGC) signals for application to the RF amplifier 11. An off-chip capacitor 44 connects from a point in the IF-AGC circuitry 42 to ground reference potential as part of the lowpass filtering of the IF-AGC signal developed by the IF-AGC circuitry 42.

The video signal response of the sound IF trap filter 41 is also supplied to a VCO lock detector 45 that detects whether or not the oscillations from the VCO 34, 35 are locked in frequency and phase with the picture carrier in the signal from the PIX IF amplifier 17. When the oscillations from the VCO 34, 35 are in lock with the picture carrier in the signal from the PIX IF amplifier 17, the detection of the video modulation is in a prescribed direction from a baseline value of voltage. In a particular embodiment of the FIG. 1 apparatus specifically referred to for purposes of description, a video signal that exhibits negative excursions from a +2 volt baseline value, extending down to +1 volt on sync tips, is synchronously detected by the in-phase synchronous video detector 18 when the VCO 34, 35 is in lock, providing the signal from the video IF amplifier 17 is not accompanied by impulse noise. When the VCO 34, 35 is out of lock, the operation of the in-phase video detector 18 is non-synchronous; and the detector response alternately swings positive and negative responsive to the phase slippage between the VCO 34, 35 oscillations and the picture carrier in the signal from the video IF amplifier 17. The VCO lock detector 45 detects swings of the in-phase video detector 18 that are positive respective to the +2 volt baseline value by more than a half volt or so, to provide an indication of lack of lock between the VCO 34, 35 oscillations and a picture carrier in the signal from the video IF amplifier 17. When the signal from the video IF amplifier 17 is accompanied by impulse noise, the operation of the in-phase video detector 18 is non-synchronous; and, if unfiltered, the detector response would alternately swing positive and negative responsive to the phase slippage between the VCO 34, 35 oscillations and the ringing of the SAW filter 15 response in the presence of impulse noise, continuing until the ringing subsides. An off-chip capacitor 46 connects from a point in the VCO lock detector 45 to ground reference potential as part of lowpass filtering of the lack of lock indications that suppresses lack of lock indications generated in response to impulse noise. The VCO lock detector 45 responds to sustained lack of lock to supply indication thereof to the phase detector 39, which generates AFPC voltage for the VCO 34, 35. Responsive to the indication of sustained lack of lock, the gain of the phase detector 39, which is very high during in-lock condition, is reduced during out-of-lock condition. This reduction of the phase detector 39 gain is accompanied by an extension of the frequency range over which the VCO 34, 35 will pull into lock.

The video signal, as detected by the in-phase video detector 18 and passed through a 4.5 MHz sound IF trap filter 41, can be supplied directly to a video amplifier 47 that supplies amplified in-phase video response to be used off-chip. The amplified in-phase video response is supplied, for example, to a horizontal sync separator and pulse shaper for generating the horizontal gating pulses supplied back to the IC 20.

FIG. 1 shows the video signal, as detected by the in-phase video detector 18 and passed through a 4.5 MHz sound IF trap filter 41, being supplied to the video amplifier 47 via impulse-noise-cancelation circuitry 50. The impulse-noise-cancelation circuitry 50 is of a type described in detail and claimed in U.S. patent application Ser. No. 07/897,812 filed Jun. 12, 1992 by Jack Rudolph Harford, entitled NOISE REDUCING APPARATUS AND METHODS FOR TELEVISION RECEIVERS, and assigned to Samsung Electronics Co., Ltd. The impulse-noise-cancelation circuitry 50 comprises a delay line 51, a noise detector 52, a pulse stretcher 53 and a track-and-hold circuit 54. The noise detector 52 detects, in the video signal from the sound IF trap filter 41, black-going impulse noise that swings past reference black level or white-going impulse noise that swings the opposite way respective to a baseline reference voltage that normal video does. The OR'ed response to these impulse conditions is stretched slightly by the pulse stretcher 53, to furnish a signal to the track-and-hold circuit 54 that conditions it to hold the last value of its output signal. Otherwise, the output signal of the track-and-hold circuit 54 tracks its input signal, a delayed response to the video signal from the sound IF trap filter 41 supplied by the delay line 51. The delay line 51 compensates for delay incurred by the noise detector 52 and the pulse stretcher 53 in performing their functions. The video signal from the track-and-hold circuit 54, which has impulse noise replaced by a continuing value of video signal, is applied to the video amplifier 47 as its input signal in FIG. 1.

Figure 4:
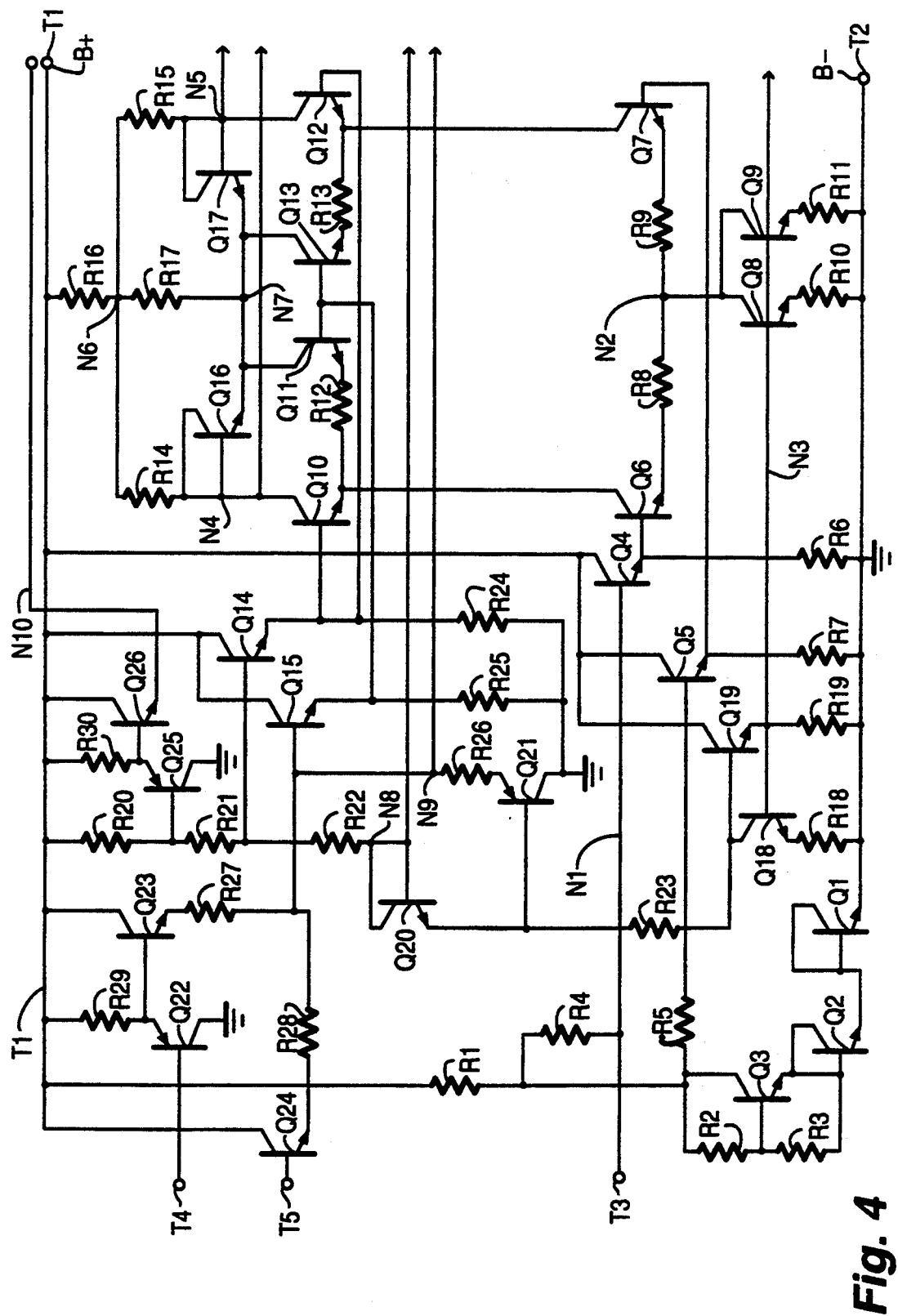
FIG. 4 is a detailed schematic diagram of the gain-controlled first voltage-amplifier stage in the second intermediate-frequency amplifier used intercarrier sound and AFT in the FIG. 1 apparatus.

FIG. 4 is a detailed schematic diagram of the gain-controlled first voltage-amplifier stage in the second intermediate-frequency amplifier 21 in the FIG. 1 apparatus. Terminals T1 and T2 provide for connections to the positive and negative terminals of an operating voltage supply. The substrate of the monolithic IC is "grounded" to the terminal T2, and during operation all potentials on the IC are positive respective to the B+ potential at the terminal T1.

A direct voltage 3.5 times as large as the emitter-base offset potential $V_{BE}$ is developed across the series connection of the emitter-to-collector paths of NPN transistors Q1, Q2 and Q3 responsive to current flowing through them via a resistor R1 from the B+ positive operating supply. Q1 and Q2 are self-biased by direct collector-to-base connections to develop respective $V_{BE}$ offsets across their emitter-to-collector paths responsive to the current flow therethrough, and resistors R2 and R3 form a resistive potential divider providing direct-coupled degenerative collector-to base feedback to Q3 for developing a 1.5 $V_{BE}$ offset across its emitter-to-collector path responsive to the current flow therethrough.

A resistor R4 applies the resulting 3.5 $V_{BE}$ offset from integrated-circuit ground, appearing at a node N1, to an input terminal T3 that receives the response of the SAW filter 16 and connects to the base of an NPN transistor Q4. A resistor R5 applies that 3.5 $V_{BE}$ offset to the base of another NPN transistor Q5. Resistors R6 and R7 provide respective emitter loads for Q4 and Q5, which are connected as common-collector amplifiers (or emitter-followers) for driving the bases of NPN transistors Q6 and Q7, respectively. Q6 and Q7 are connected in emitter-coupled differential-amplifier configuration with respective emitter degeneration resistors R8 and R9 connected to a node N2, from which the collector currents of NPN transistors Q8 and Q9 are withdrawn. Q8 and Q9 are provided with respective emitter resistors R 10 and R11, and their bases connect to a node N3 for receiving a direct bias potential, conditioning Q8 and Q9 to function as constant current generators for withdrawing current from the node N2.

Q6 and Q7 supply collector currents that exhibit balanced amplified response to the single-ended SAW filter 16 response applied to the input terminal T3. These collector currents are supplied to respective current splitters, used in the automatic gain control (AGC) of the emitter-coupled differential-amplifier configuration in which Q6 and Q7 are connected. NPN transistors Q10 and Q11 are connected as a current-splitter for the collector current of Q6, with the emitter of Q10 directly connected to the collector of Q6 and with the emitter of Q11 connected to the collector of Q6 via a resistor R12. The NPN transistors Q12 and Q13 are connected as a current-splitter for the collector current of transistor Q7, with the emitter of Q12 directly connected to the collector of Q7 and with the emitter of Q12 connected to the collector of Q7 via a resistor R13. The bases of Q10 and Q12 connect to the emitter of an NPN transistor Q14 for receiving a positive direct bias potential; and the bases of Q11 and Q13 connect to the emitter of an NPN transistor Q15 for receiving a gain control voltage. The collectors of Q10 and Q12 connect to nodes N4 and N5, respectively, which are connected via resistors R14 and R15, respectively, to a node N6. A series dropping resistor R16 connects from the B+ terminal T1 to the node N6, which is a "virtual ground" for AC signal.

Further to implement the AGC of the emitter-coupled differential-amplifier configuration in which Q6 and Q7 are connected, an electrically controllable conductance is provided between nodes N4 and N5. The joined collector and base of an NPN transistor Q16 as well as the collector of Q10 connect to the node N4. The joined collector and base of an NPN transistor Q17 as well as the collector of Q12 connect to the node N5. The emitters of Q16 and Q17 and the collectors of Q11 and Q13 are all conductively joined at a node N7 to which the node N6 is connected via a resistor R17.

In operation, the collector output current of differential-amplifier transistor Q6 constitutes the tail current of differential pair transistors Q10 and Q11, which function as a current-splitter. Depending on the control signal level at the emitter of Q15, the collector output current of differential-amplifier transistor Q6 can be steered through transistor Q10 or through transistor Q11 and thence through diode-connected transistor Q16, or partly through each of the transistors Q10 and Q11. In symmetrical fashion, the collector output current of differential-amplifier transistor Q7 can be steered through transistor Q12 or through transistor Q13 and thence through diode-connected transistor Q17, or partly through each of the transistors Q12 and Q13.

The steering of currents to flow entirely through Q11 and Q13 applies the entire collector currents of Q6 and Q7 including their differential variations to the node N7, where the differential signal variations cancel each other out at another "virtual ground" for AC. There are no components of Q10 and Q12 collector currents flowing through Q11 and Q13, the differential variations of which can respectively flow to the load resistors R14 and R 15 to cause corresponding balanced-signal voltages across them. The common-mode DC components of the collector currents of Q6 and Q7 are in combined flow through the diode-connected transistors Q16 and Q17, causing their conductances to become relatively small respective to those of the load resistors R14 and R15, respectively. The low shunt resistances of the diode-connected transistors Q16 and Q17 determine the voltage gain of the emitter-coupled differential-amplifier connection of Q6 and Q7 as they ratio against resistances of resistors R14 and R15, respectively. When the combined collector currents of Q6 and Q7 are steered through diode-connected transistors Q16 and Q17, the gain will be at its minimum level.

The steering of currents to flow entirely through Q10 and Q12 applies the entire collector currents of Q6 and Q7 including their differential variations to the load resistors R14 and R15, respectively. The concomitant steering of currents away from Q11 and Q13 results in no current being steered through the diode-connected transistors Q16 and Q17, so their conductances are accordingly very low and do not shunt the load resistors R14 and R15 appreciably. The voltage gain of the emitter-coupled differential-amplifier connection of Q6 and Q7 is therefore is at its maximum level.

The steering of the collector currents of Q6 and Q7 only partially through Q10 and Q12 reduces gain by applying only a fraction of the differential variations of the Q6 and Q7 collector currents to the load resistors R14 and R15, thereby reducing the corresponding signal voltages across them in a degree controlled by the departure of the gain control potential at the emitter of Q15 from the direct bias potential at the emitter of Q14. The steering of the collector currents of Q6 and Q7 partially through Q11 and Q13 at the same time further reduces gain by causing the common-mode components of the collector currents to flow through the diode-connected transistors Q16 and Q17, so their conductances shunt the load resistors R14 and R15 in a degree also controlled by the departure of the gain control potential at the emitter of Q15 from the direct bias potential at the emitter of Q14.

In any case, the total current in resistor R14 remains unchanged during the gain control process, being always equal to the collector output current of transistor Q6 and likewise, the total current in resistor R15 remains unchanged during the gain control process, being always equal to the collector output current of transistor Q7. Thus, if the transistors are well matched, as the gain is changed there will be no disturbance of the DC conditions at the nodes N4 and N5.

FIG. 4 also shows the circuitry used to regulate the bias voltage on the node N3 to be around a volt or so. An NPN transistor Q18 has its base connected from the node N3 and has its emitter connected via a resistor R18 to a point of ground potential. A common-collector-amplifier NPN transistor Q19 has a base to which the transistor Q18 connects and has an emitter connected to the node N3. The emitter-follower action of the transistor Q19 provides direct-coupled collector-to-base feedback for the transistor Q18, which feedback conditions the transistor Q18 to demand collector current. This demand for collector current is met by current flow from the positive operating voltage supply connected to the terminal B+, the current flow being through the series connection of resistors R20, R21 and R22; a forward-poled, diode-connected NPN transistor Q20; and a further resistor R23. Points within this series connection are used for providing direct voltage bias to various portions of the FIG. 4 and FIG. 5 circuitry.

The direct potential at the interconnected ends of R21 and R22 is somewhat more positive than the direct potential at a node N6 to which the other end of R22 connects. Direct potential at the node N8, to which the collector and base of Q20 each connect, biases the base of Q14. The common-collector-amplifier transistors Q14 and Q15 have respective emitter-load resistors R24 and R25 connecting their emitters to points of ground potential. Q15 has its base connected to a node N9. The direct potential at the emitter of Q20 is applied to the base of a grounded-collector PNP transistor Q21 to develop a direct bias potential at the emitter of Q21 that tracks the node N8 potential and is applied to the node N9.

Absent positive current flow into node N9 either via a resistor R27 or via a resistor R28, the base potential of Q15 is less positive than that of Q14. The emitter potential of Q15 is then less positive than that of Q14, cutting off conduction through Q11 and Q13. Q10 and Q12 are conductive, applying the entire collector currents of the emitter-coupled differential-amplifier transistors Q6 and Q7 to their respective collector load resistors R14 and R15 to provide maximum voltage gain. The potential drop across the resistor R22 provides for delayed AGC of the first controlled-voltage-gain stage of the second IF amplifier, so that gain is first reduced in the second controlled-voltage-gain stage of the second IF amplifier.

A terminal T4 receives automatic-gain-control (AGC) signal voltage from the IF-AGC circuitry 42 (shown in FIG. 1), which is applied to the base of a common-collector-amplifier PNP transistor Q22, the emitter of which connects to the B+ terminal T1 via an emitter load resistor R29 and also connects to the base of a common-collector-amplifier NPN transistor Q23. The cascaded common-collector amplifiers including Q22 and Q23 form a zero-offset voltage follower for applying the AGC signal voltage received at the terminal T4 to the end of the resistor R27 remote from its end connected to the node N9. The resistors R26 and R27 form a resistive potential divider for applying a fraction of the AGC signal voltage received at the terminal T4 to the base of Q15. As the AGC signal voltage received at the terminal T4 becomes more positive, current-splitter transistors Q11 and Q13 are biased into increased conduction, to steal emitter current from the common-base amplifier transistors Q10 and Q12 and to increase the conduction of the diode-connected transistors Q16 and Q17, both of which actions reduce the voltage gain of the differential amplifier comprising the emitter-coupled transistors Q6 and Q7 withdrawing balanced collector currents through their respective collector load resistors R14 and R15.

Figure 8:
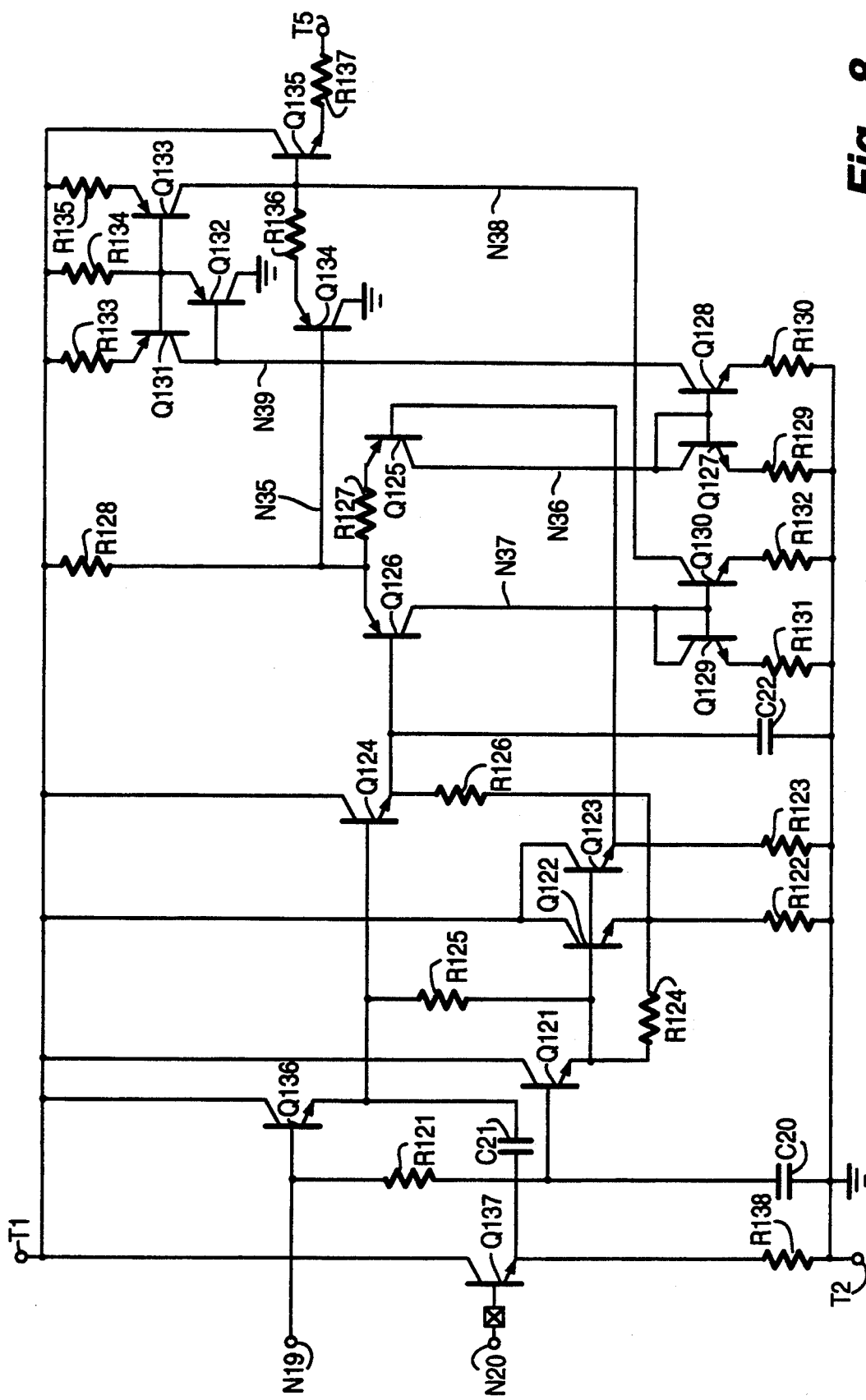
FIG. 8 is a detailed schematic diagram of an overload automatic gain control (AGC) detector for the FIG. 4 second intermediate-frequency amplifier in the FIG. 1 apparatus.

A terminal T5 receives an overload AGC signal voltage generated by the FIG. 8 circuitry in a manner described further on in this specification and applied to the base of a common-collector-amplifier NPN transistor Q24. The emitter of Q24 connects to the end of the resistor R28 remote from its end connected to the node N9. The resistors R26 and R28 form a resistive potential divider for applying a fraction of the overload AGC signal voltage received at the terminal T5, as offset by the $V_{BE}$ emitter-to-base potential offset of the emitter-follower transistor Q24, to the base of Q15. As the overload AGC signal voltage received at the terminal T5 becomes more positive, current-splitter transistors Q11 and Q13 are biased into increased conduction, to steal emitter current from the common-base amplifier transistors Q10 and Q12 and to increase the conduction of the diode-connected transistors Q16 and Q17, both of which actions reduce the voltage gain of the differential amplifier comprising the emitter-coupled transistors Q6 and Q7 withdrawing balanced collector currents through their respective collector load resistors R14 and R15.

Figure 5:
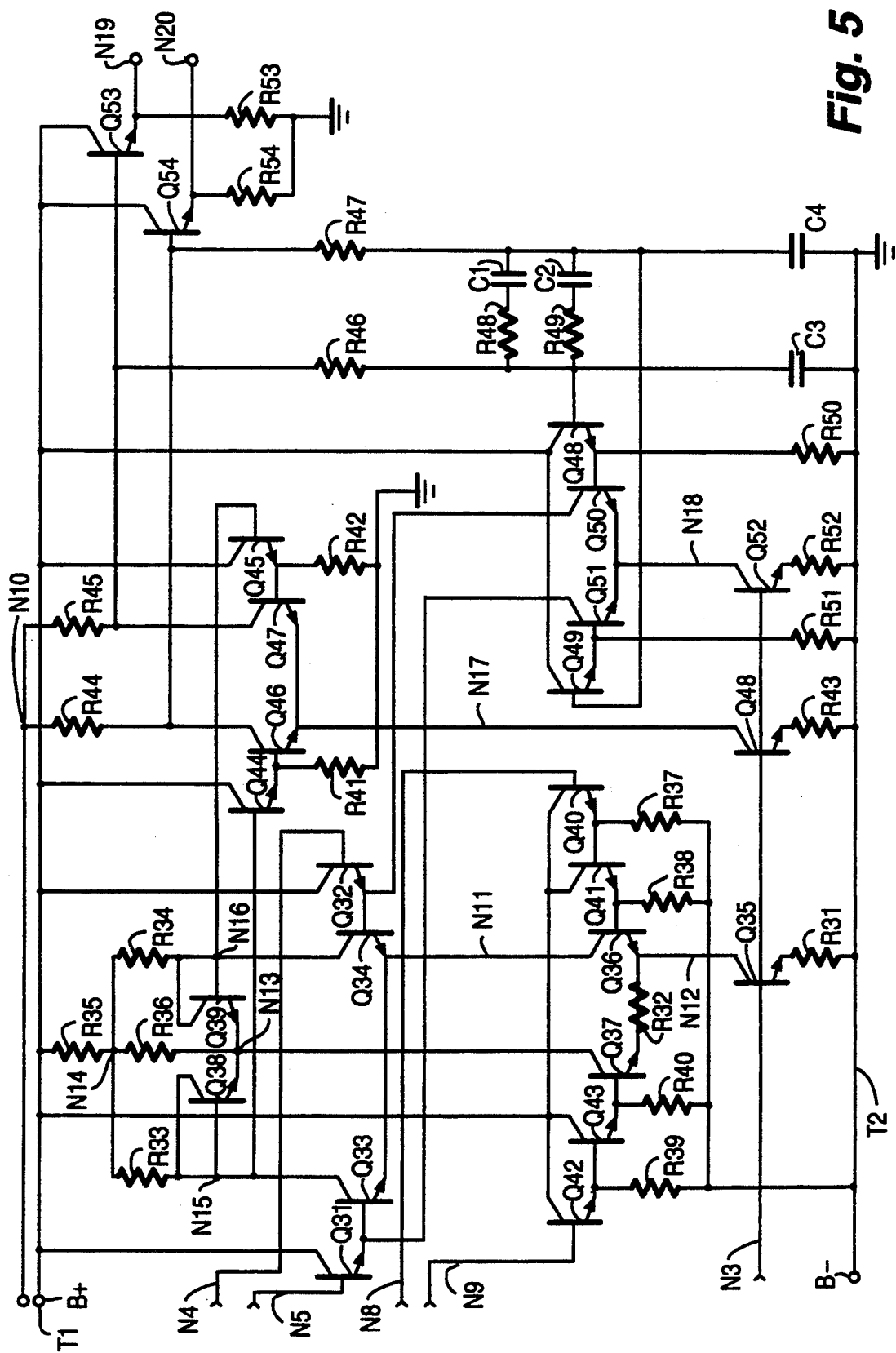
FIG. 5 is a detailed schematic diagram of the gain-controlled second voltage-amplifier stage, the fixed-gain third voltage-amplifier stage, and direct-coupled differential-mode feedback circuitry in the second intermediate-frequency amplifier used for intercarrier sound and AFT in the FIG. 1 apparatus.

The potential at the interconnection of the resistors R20 and R21 is used to determine the operating potential for the third voltage-amplifier stage of FIG. 5. The potential at the interconnection of the resistors R20 and R21 is applied to the base of a common-collector-amplifier PNP transistor Q25, the emitter of which connects to the B+ terminal T1 via an emitter load resistor R30 and also connects to the base of a common-collector-amplifier NPN transistor Q26. The cascaded common-collector amplifiers including Q25 and Q26 form a zero-offset voltage follower for supplying the operating potential for the third voltage-amplifier stage of FIG. 5.

FIG. 5 shows the gain-controlled second voltage-amplifier stage, the fixed-gain third voltage-amplifier stage and direct-coupled differential-mode feedback circuitry in the second intermediate-frequency amplifier 21 of the FIG. 1 apparatus. The AGC'd balanced response of the emitter-coupled differential amplifier comprising Q6 and Q7, available at nodes N4 and N5, is coupled by the emitter-follower action of the common-collector amplifier transistors Q31 and Q32 to the bases of NPN transistors Q33 and Q34.

Q33 and Q34 are the emitter-coupled pair in a further emitter-coupled differential amplifier, which also has AGC applied thereto and is included within the gain-controlled second voltage-amplifier stage. The AGC of this further emitter-coupled differential amplifier differs from that of the preceding emitter-coupled differential amplifier, since the signal levels being controlled do not vary over so wide a dynamic range. Since the further emitter-coupled differential amplifier is not exposed to overload on strong signals, emitter degeneration of Q33 and Q34 is not necessary, and their emitters connect directly to a node N11 used as the tail connection. This permits AGC to be carried forward, at least in part, through control of the transconductances of Q33 and Q34 in response to varying their emitter currents. This can be done by controlling their combined emitter currents, withdrawn from the node N11 as a tail current.

An NPN transistor Q35 has its base connected to the node N3 for receiving direct bias potential and has its emitter connected to terminal T2 via a resistor R31, which connections condition Q35 to demand a constant collector current from a node N12. NPN transistors Q36 and Q37 form a current-splitter, the emitter of Q36 connecting directly to the node N12 and the emitter of Q37 connecting to the node N12 via a resistance R32. Q36 and Q37 form a current-splitter, the collector of Q36 connecting to the node N11 to withdraw tail current therefrom, and the collector of Q37 connecting to a node N13 to withdraw current therefrom.

Respective collector load resistors R33 and R34 connect from a node N14 to nodes N15 and N16, respectively, to which the collectors of the emitter-coupled differential-amplifier pair Q33 and Q34 respectively connect. The node N14 is connected by a decoupling resistor R35 to the B+ terminal T1. The joined collector and base of a diode-connected NPN transistor Q38 connect directly to the node N15, and its emitter connects directly to the node N13. The joined collector and base of a diode-connected NPN transistor Q39 connect directly to the node N16, and its emitter connects directly to the node N13. The node N13, which is a "virtual ground" for AC, is connected by a pull-up resistor R36 to the node N14, which is also a "virtual ground" for AC. The diode-connected transistors Q38 and Q39 provide an electrically controllable conductance between nodes N15 and N16, which conductance is controlled as an exponential function of the collector current of Q37.

The direct bias potential developed at the node N8 in the FIG. 4 biasing circuitry is translated to lower potential by the combined emitter-to-base offset voltages of NPN transistors Q40 and Q41 for application the base of Q36. Q40 and Q41 are connected as cascaded common-collector amplifiers, or emitter followers, with respective emitter load resistors R37 and R38 connecting their emitters to ground terminal T2. The divided AGC potential developed at the node N9 in the FIG. 4 AGC circuitry is translated to lower potential by the combined emitter-to-base offset voltages of NPN transistors Q42 and Q43 for application the base of Q37. Q42 and Q43 are connected as cascaded common-collector amplifiers, or emitter followers, with respective emitter load resistors R39 and R40 connecting their emitters to ground terminal T2.

In the operation of the second controlled-voltage-gain IF amplifier, collector current from Q35 is steered by the transistor pair Q36 and Q37, between providing tail current for the differential-amplifier transistors Q33 and Q34 on the one hand, and providing bias current for diode-connected transistors Q38 and Q39 on the other hand. When the diode-connected transistors Q38 and Q39 carry no current, the gain is at its maximum value, being determined by maximum tail current and by the collector load resistors R33 and R34. When the translated divided AGC potential at the base of Q37 is positive enough to bias Q37 into conduction, the diode-connected transistors Q38 and Q39 are biased into conduction, to shunt the collector resistors R33 and R34 of Q33 and Q34 to reduce their gain. At the same time, the conduction of transistor Q37 reduces the current available for flow through Q36 and as tail current for Q33 and Q34. This reduced tail current operates Q33 and Q34 at reduced transconductance and thus reduces their gain further. In any event, the DC through each of resistors R33 and R34 is not disturbed by the operation of gain control. However, when more than half of the operating tail current for the differential amplifier pair is steered into the diode-connected transistors Q38 and C-39, noise performance will start to degrade. This is because of the poorer noise figures of Q33 and Q-34 as their internal emitter resistances increase responsive to reduced current conduction by the principal conduction path of transistor Q36. Accordingly, the reduction of stage gain by the shunting of the collector load resistors R33 and R34 by diode-connected transistors Q38 and Q39 is the mechanism for gain reduction principally relied on, rather than reduction of the transconductances of Q33 and Q34 through starvation of their tail current. The normal range of gain control is upward from about 0 dB, then, to 26 dB or so.

NPN transistors Q44 and Q45 are arranged as common-collector-amplifiers, or emitter-followers, for applying the balanced signals at the nodes N15 and N16 to a third voltage-gain stage. The emitters of Q44 and Q45 respectively connect to ends of resistors R41 and R42, the other ends of which connected to ground terminal T2. The gain-controlled, amplified, balanced IF signals at the emitters of the emitter-follower transistors Q44 and Q45 are applied to the bases of NPN transistors Q46 and Q47, which transistors Q46 and Q47 are a differential amplifier pair having their respective emitters connected to a node N17. Another NPN transistor Q48 has its base connected to the node N3 for receiving direct bias potential and has its emitter connected to integrated-circuit ground via a resistor R43, which connections condition Q48 to demand a constant collector current from the node N17. The collectors of transistors Q46 and Q47 are connected via respective resistors R44 and R45 to the node N10, to which the bias circuitry shown in FIG. 4 applies a positive operating supply voltage that is reduced from that applied to the B+ terminal T1.

The direct bias potentials on which the balanced IF output signals at the collectors of transistors Q46 and Q47 are superposed are automatically adjusted by a differential-mode direct-coupled DC feedback loop. The balanced IF output signals at the collectors of transistors Q46 and Q47 are supplied to a four-terminal lowpass filter. Resistors R46, R47, R48 and R49 and capacitances C1, C2, C3 and C4 are included in this four-terminal lowpass filter, which supplies a balanced response to the bases of common-collector-amplifier NPN transistors Q48 and Q49. Q48 and Q49 have respective emitter load resistors R50 and R51 connecting their emitters to a point at ground potential.

The balanced response applied to the bases of Q48 and Q49 essentially consists of the direct bias potentials on which the balanced IF output signals are superposed; and Q48 and Q49 function as voltage followers of the emitter-follower type for applying the difference between these direct potentials between the bases of NPN transistors Q50 and Q51 connected in emitter-coupled differential amplifier conguration. A node N18 at which their emitters interconnect has the collector of an NPN transistor Q52 connected thereto. Q52 has its base connected to the node N3 for receiving direct bias potential and has its emitter connected to ground terminal T2 via a resistor R52, which connections condition Q52 to demand a constant collector current from the node N18. The collectors of the transistors Q50 and Q51 are connected to withdraw balanced currents from the emitters of the previously described emitter-follower transistors Q32 and Q31, respectively, in response to the difference between the direct potentials at the collectors of transistors Q46 and Q47. These connections close the direct-coupled, differential-mode DC feedback loop used for eliminating any substantial difference between these direct bias potentials.

NPN transistors Q53 and Q54 are arranged as voltage followers of the emitter-follower type and serve as output buffer stages. The bases of Q53 and Q54 have the collectors of Q46 and Q47 respectively connecting to them, and the collectors of Q53 and Q54 connect to the B+ terminal T1. The emitters of transistors Q53 and Q54 connect to ends of respective load resistors R53 and R54, the other ends of which connect to ground. The emitters of transistors Q53 and Q54 supply 400 mV. gain-controlled, amplified, balanced IF signals at nodes N19 and N20, for application to the intercarrier detector 22 used in the FIG. 1 apparatus for generating 4.5 MHz intercarrier sound intermediate frequencies, and for application to the limiter 28 used for limiting the picture carrier as translated to an IF.

Figure 6:
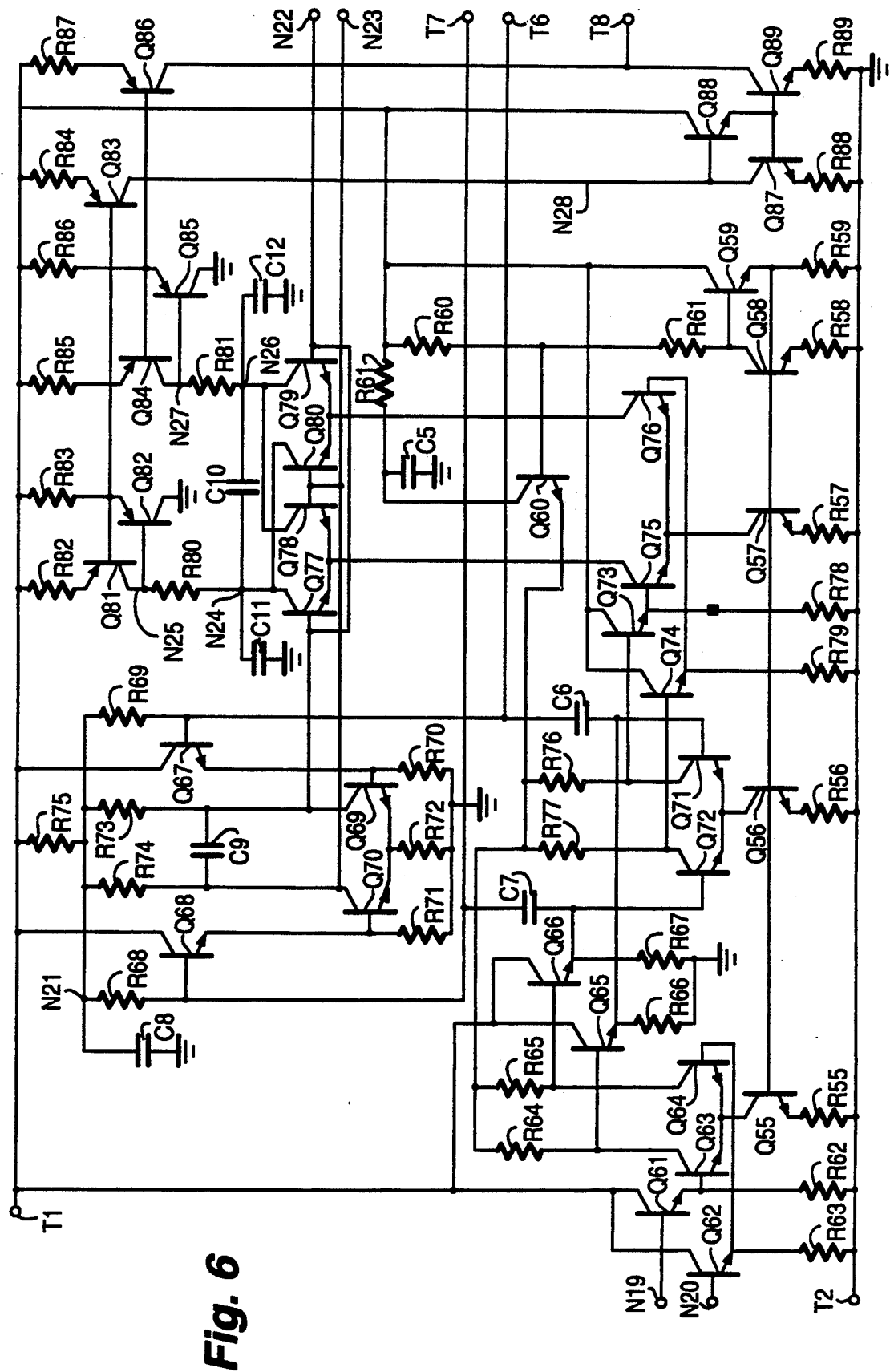
FIG. 6 is a more detailed schematic diagram of the portion of the FIG. 1 apparatus used for limiting the picture carrier as translated to an IF and developing from this limited carrier an automatic fine tuning (AFT) signal for controlling the frequency of the local oscillator used to supply signals for heterodyning with the received television signal when downconverting it to intermediate frequencies.

FIG. 6 is a more detailed schematic diagram of the portion of the FIG. 1 apparatus used for limiting the picture carrier as translated to IF and developing from this limited carrier an automatic fine tuning (AFT) signal for controlling the frequency of the local oscillator used to supply signals for heterodyning with the received television signal when downconverting it to intermediate frequencies. The AFT signal is developed by a quadrature detector, as will be described after considering some details of the circuitry providing direct bias voltages and currents to other portions of the FIG. 6 circuitry.

Three constant current sinks are provided at the respective collectors of NPN transistors Q55, Q56 and Q57, which are the slave transistors of a plural-output current mirror amplifier having an NPN transistor Q58 as its master transistor. Q55, Q56, Q57 and Q58 have respective emitter degeneration resistors R55, R56, R57 and R58 connecting their emitters to the ground terminal T2. An NPN transistor Q59 is connected as a common-collector amplifier for providing direct-coupled collector-to-base feedback for Q58. Q59 has an emitter load resistor R59 connected from its emitter to the ground terminal T2, and its emitter potential is applied directly to the bases of Q55, Q56, Q57 and Q58. The input current into the current mirror amplifier configuration comprising Q55, Q56, Q57, Q58 and Q59 and their respective emitter resistors R55, R56, R57, R58 and R59 is regulated by the current flow through the series connection of resistors R 60 and R 61 from the B+ terminal T1. The direct bias potential appearing at the interconnected ends of resistors R60 and R61 is applied to the base of an NPN transistor Q60, which responds to that direct bias potential for supplying by emitter-follower action an intermediate operating supply voltage at its emitter. A decoupling resistor R61 connects the collector of Q60 to the B+ terminal T 1, and a capacitor C5 connects from the collector of Q60 to the ground terminal T2.

NPN transistors Q61 and Q62 are arranged as common-collector-amplifiers, or emitter-followers, for the balanced, amplified IF signals the FIG. 5 circuitry provides at the nodes N19 and N20. The emitters of Q61 and Q62 respectively connect to ends of resistors R62 and R63, the other ends of which connected to ground terminal T2.

The gain-controlled, amplified, balanced IF signals at the emitters of the emitter-follower transistors Q61 and Q62 are applied to the bases of NPN transistors Q63 and Q64, the interconnected emitters of which connect to the current sink provided at the collector of Q55. The collectors of Q63 and Q64 are connected via respective resistors R64 and R65 to the emitter of Q60, which supplies them a positive operating potential. The signal supplied between the base electrodes of Q63 and Q64 has about 400 mV. peak-to-peak swing, which tends to cause switched alternative conduction of Q63 and Q64. During excursions from the average value axis in a first polarity sense, Q63 is conductive and the constant collector current demand of the current sink transistor Q55 is satisfied by current flow through the resistor R64. During excursions from the average value axis in a second polarity sense, opposite to the first polarity sense, Q64 is conductive and the constant collector current demand of the current sink transistor Q55 is satisfied by current flow through the resistor R65.

NPN transistors Q65 and Q66 are arranged as common-collector-amplifiers, or emitter-followers, for the balanced, symmetrically clipped "square" waves thus developed at the collectors of Q63 and Q64. The emitters of Q65 and Q66 respectively connect to ends of resistors R66 and R67, the other ends of which connected to ground terminal T2. The current sink transistor Q55, the emitter-coupled differential-amplifier transistors Q63 and Q64, the collector load resistors R64 and R65 and the emitter-follower connections of Q65 and Q66 provide the limiter 28 of FIG. 1.

The capacitors 29 and 30 of FIG. 1 correspond to capacitors C6 and C7 in FIG. 6, which capacitors 29 and 30 connect the emitters of Q65 and Q66 to terminals T6 and T7 respectively. The ends of the off-chip AFT coil 31 shown in FIG. 1 connect to the terminals T6 and T7 of FIG. 6. The off-chip AFT coil 31 tunes against the capacitors 29 and 30 to generate a nominally quadrature-phase separated video carrier at the terminals T6 and T7 of FIG. 6. The terminals T6 and T7 connect to first ends of resistors R68 and R69, the second ends of which connect to a node N21. R68 and R69 reduce the Q of the tuned circuit, so its phase response does not change too rapidly around the picture carrier as translated to an IF. The tuned circuit provides selectivity of frequency response for separating from the balanced, symmetrically clipped "square" waves at the emitters of Q65 and Q66 the picture carrier as translated to an IF, reducing the need for additional limiter stages in order to provide additional capture ratio further to suppress the sound carrier as translated to an IF. The use of a single limiter stage to develop the balanced, symmetrically clipped "square" waves to be filtered by this tuned circuit reduces the harmonic content of the signal to be filtered, which reduces tendencies towards developing spurious beats in the 4.5 MHz sound-IF signal.

NPN transistors Q67 and Q68 are arranged as common-collector-amplifiers, or emitter-followers, for the quadrature-phase separated video carrier at the terminals T6 and T7. The emitters of Q67 and Q68 respectively connect to ends of resistors R70 and R71, the other ends of which connected to ground terminal T2. The quadrature-phase separated video carrier at the emitters of the emitter-follower transistors Q67 and Q68 are applied to the bases of emitter-coupled differential-amplifier NPN transistors Q69 and Q70, the interconnected emitters of which connect to an end of a tail resistor R72 connected at its other end to the ground terminal T2. The collectors of Q69 and Q70 connect to a node N22 and to a node N23, respectively, and thencefrom to the node N21 via respective collector load resistors R73 and R74. The node N21 is connected via a decoupling resistor R75 to the B+ terminal T1. A capacitor C8 with plates respectively connecting to the node N21 and the ground terminal T2 bypasses the node N21 for high frequencies. A capacitor C9 with respective plates connecting to the nodes N22 and N23 cooperates with the collector load resistors R73 and R74 for providing additional phase shift to the amplified quadrature-phase separated video carrier. The emitter follower connections of Q67 and Q68 and the emitter-coupled differential-amplifier connections of Q69 and Q70 provide the amplifier 32 of FIG. 1.

The balanced, symmetrically clipped "square" waves at the emitters of Q65 and Q66 are applied to the bases of NPN transistors Q71 and Q72, which are emitter-coupled differential-amplifier transistors the interconnected emitters of which connect to the current sink provided at the collector of Q56. The collectors of Q71 and Q72 are connected via respective resistors R76 and R77 to the emitter of Q60, which supplies them a positive operating potential. The signal supplied between the base electrodes of Q71 and Q72 has about 300 mV. peak-to-peak swing, which tends to cause switched alternative conduction of Q71 and Q72. During excursions from the average value axis in a first polarity sense, Q71 is conductive and the constant collector current demand of the current sink transistor Q56 is satisfied by current flow through the resistor R76. During excursions from the average value axis in a second polarity sense, opposite to the first polarity sense, Q72 is conductive and the constant collector current demand of the current sink transistor Q56 is satisfied by current flow through the resistor R77. NPN transistors Q73 and Q74 are arranged as common-collector-amplifiers, or emitter-followers, for the balanced square waves thus developed at the collectors of Q71 and Q72. The emitters of Q73 and Q74 respectively connect to ends of resistors R 78 and R 79, the other ends of which connected to ground terminal T2. The current sink transistor Q 56, the emitter-coupled differential-amplifier transistors Q71 and Q72, the collector load resistors R76 and R77 and the emitter-follower connections of Q73 and Q74 provide a further limiter stage "stripping off" the amplitude modulation of the picture carrier as translated to an IF, thereby suppressing the sound carrier as translated to an IF so as to increase capture ratio for the picture carrier as translated to an IF.

The remaining portions of the FIG. 6 circuitry may be considered as being associated with the AFT product detector 33 of FIG. 1. The balanced, square waves at the emitters of Q73 and Q74 are applied to the bases of NPN transistors Q75 and Q76, which are emitter-coupled differential-amplifier transistors the interconnected emitters of which connect to the current sink provided at the collector of Q57. The long-tailed pair connection of NPN transistors Q75 and Q76 provides still further limiting to the balanced, square wave currents corresponding to in-phase separated video carrier demanded at the collectors of Q75 and Q76. The collector of Q75 connects to the joined emitters of NPN transistors Q77 and Q78. The collector of Q76 connects to the joined emitters of NPN transistors Q79 and Q80. The bases of Q77 and Q79 connect to the node N22, and the bases of Q78 and Q80 connect to the node N23. The collectors of Q77 and Q80 connect to a node N24, connected via a resistor R80 to a node N25 and thencefrom to the B+ terminal T1 via one input circuit of a balanced-to-single-ended converter; and the collectors of Q78 and Q79 connect to a node N26, connected via a resistor R81 to a node N27 and thencefrom to the B+ terminal T1 another input circuit of that balanced-to-single-ended converter.

The capacitor C10 combines with the resistors R80 and R81 to provide a lowpass filter for differential-mode components of the collector currents of Q75 and Q76, as split and recombined by connections of Q77, Q78, Q79 and Q80. The capacitors C11 and C12 combine with the resistors R80 and R81, respectively, to provide lowpass filters for the common-mode components of the collector currents of Q75 and Q76, as split and recombined by connections of Q77, Q78, Q79 and Q80. This lowpass filtering suppresses the intermediate frequencies and their harmonics.

The balanced-to-single-ended converter, with balanced input connections at the nodes N25 and N27 and an output connection to a terminal T8, includes:

a first current mirror amplifier with input connection at the node N25, with common connection to the B+ terminal T1, and with output connection at a node N28;

a second current mirror amplifier with input connection at the node N27, with common connection to the B+ terminal T1, and with output connection to the terminal T8; and a third current mirror amplifier with input connection at the node N28, with common connection to the ground terminal T2, and with output connection to the terminal T8. The first current mirror amplifier includes a PNP transistor Q81 with emitter degeneration resistor R82 as master transistor, a PNP in-substrate transistor Q82 with emitter load resistor R83 connected as an emitter-follower to provide Q81 direct-coupled collector-to-base feedback, and a PNP transistor Q83 with emitter degeneration resistor R84 as slave transistor. The second current mirror amplifier includes a PNP transistor Q84 with emitter degeneration resistor R85 as master transistor, a PNP in-substrate transistor Q85 with emitter load resistor R86 connected as an emitter-follower to provide Q84 direct-coupled collector-to-base feedback, and a PNP transistor Q86 with emitter degeneration resistor R87 as slave transistor. The third current mirror amplifier includes an NPN transistor Q87 with emitter degeneration resistor R88 as master transistor, an NPN transistor Q88 connected as an emitter-follower to provide Q87 direct-coupled collector-to-base feedback, and an NPN transistor Q89 with emitter degeneration resistor R89 as slave transistor.

Figure 7:
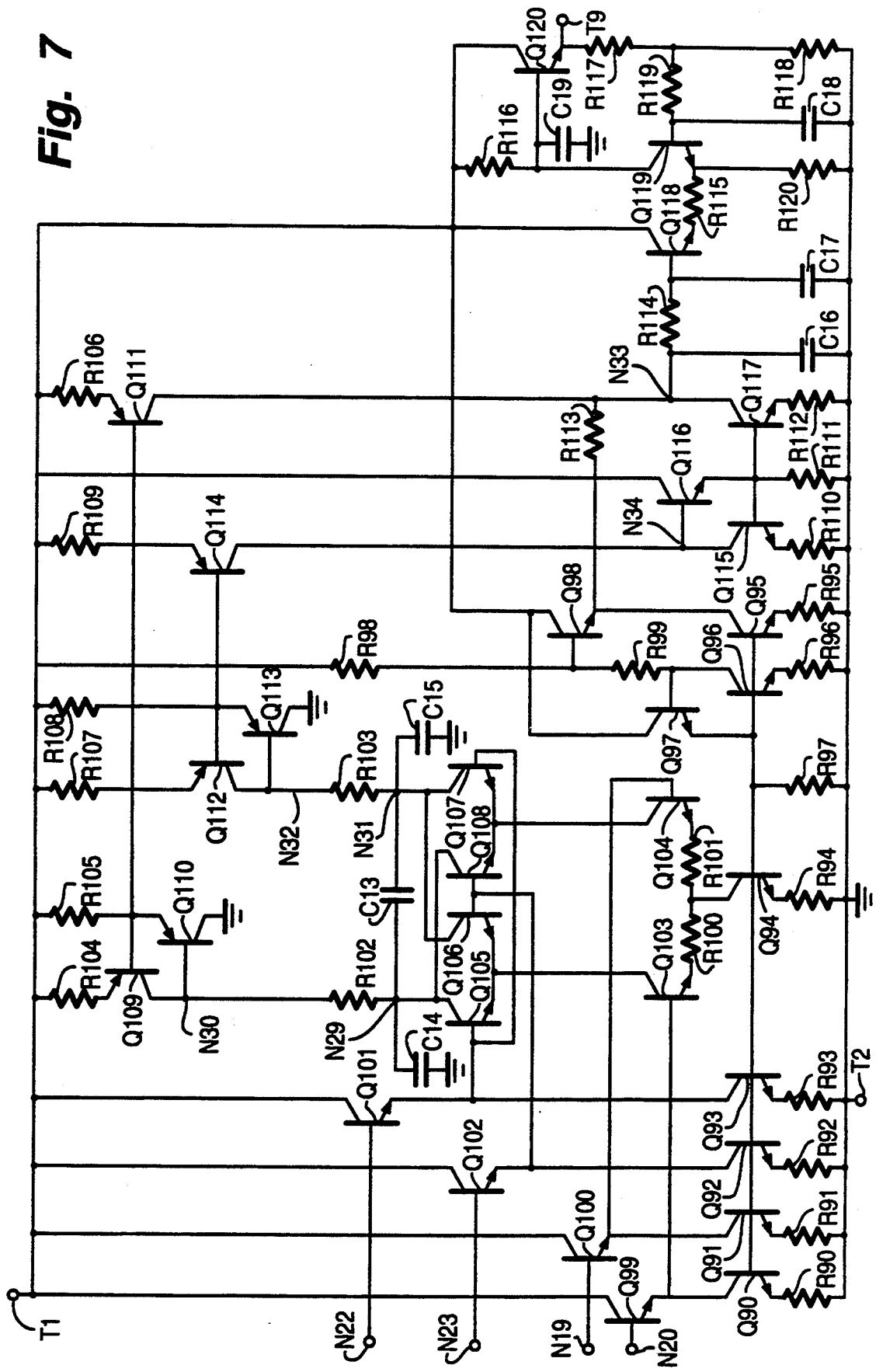
FIG. 7 is a detailed schematic diagram of the video detector used in the FIG. 1 apparatus for generating 4.5 MHz intercarrier sound intermediate frequencies and connected after the FIG. 4 second intermediate-frequency amplifier.

FIG. 7 is a detailed schematic diagram of the intercarrier if detector 22 used in the FIG. 1 apparatus for generating 4.5 MHz intercarrier sound intermediate frequencies and connected after the second intermediate-frequency amplifier 21. The sound-IF signal is developed by a product detector used as mixer, as will be described after considering some details of the circuitry providing direct bias voltages and currents to other portions of the FIG. 7 circuitry.

Six constant current sinks are provided at the respective collectors of NPN transistors Q90, Q91, Q92, Q93, Q94 and Q95, which are the slave transistors of a plural-output current mirror amplifier having an NPN transistor Q96 as its master transistor. Q90, Q91, Q92, Q93, Q94, Q95 and Q96 have respective emitter degeneration resistors R90, R91, R92, R93, R94, R95 and R96 connecting their emitters to the ground terminal T2. An NPN transistor Q97 is connected as a common-collector amplifier for providing direct-coupled collector-to-base feedback for Q96. Q97 has an emitter load resistor R97 connected from its emitter to the ground terminal T2, and its emitter potential is applied directly to the bases of Q90, Q91, Q92, Q93, Q94, Q95 and Q96. The input current into the current mirror amplifier configuration comprising Q90, Q91, Q92, Q93, Q94, Q95, Q96 and Q97 and their respective emitter resistors R90, R91, R92, R93, R94, R95, R96 and R97 is regulated by the current flow through the series connection of resistors R98 and R99 from the B+terminal T1. The direct bias potential appearing at the interconnected ends of resistors R98 and R99 is applied to the base of an NPN transistor Q98, which responds to that direct bias potential for supplying by emitter-follower action an intermediate operating supply voltage at its emitter.

NPN transistors Q99 and Q100 are arranged as common-collector-amplifiers, or emitter-followers, for the balanced, amplified IF signals the FIG. 5 IF amplifier circuitry provides at the nodes N19 and N20. NPN transistors Q101 and Q102 are arranged as common-collector-amplifiers, or emitter-followers, for the balanced, amplified quadrature-phase picture carrier as translated to an IF the FIG. 6 circuitry provides at the nodes N22 and N23. The emitters of Q99, Q100, Q101 and Q102 connect to the collectors of current sink transistors Q90, Q91, Q92 and Q93, respectively.

The emitters of Q99 and Q100 are also connected to apply balanced, amplified IF signals to the bases of NPN transistors Q103 and Q104, respectively. Q103 and Q104 are emitter-coupled differential-amplifier transistors the emitters of which connect via resistors R100 and R101, respectively, to the collector of current sink transistor Q94. The emitter degeneration afforded by R100 and R101 linearize the emitter-coupled differential-amplifier connection of Q103 and Q104. The collector of Q103 connects to the joined emitters of NPN transistors Q105 and Q106. The collector of Q104 connects to the joined emitters of NPN transistors Q107 and Q108. The bases of Q105 and Q107 connect to the emitter of Q101, and the bases of Q106 and Q108 connect to the emitter of Q102. Q101 and Q102 are emitter-followers for the the balanced, amplified quadrature-phase picture carrier as translated to an IF that the FIG. 6 circuitry provides at the nodes N22 and N23. The collectors of Q105 and Q108 connect to a node N29, connected via a resistor R102 to a node N30 and thencefrom to the B+ terminal T1 via one input circuit of a balanced-to-single-ended converter; and the collectors of Q106 and Q107 connect to a node N31, connected via a resistor R 103 to a node N32 and thencefrom to the B+ terminal T1 another input circuit of that balanced-to-single-ended converter.

The capacitor C13 combines with the resistors R102 and R103 to provide a lowpass filter for differential-mode components of the collector currents of Q103 and Q104, as split and recombined by connections of Q105, Q106, Q107 and Q108. The capacitors C14 and C15 combine with the resistors R102 and R103, respectively, to provide lowpass filters for the common-mode components of the collector currents of Q103 and Q104, as split and recombined by connections of Q105, Q106, Q107 and Q108. This lowpass filtering suppresses the 40+ MHz intermediate frequencies and their harmonics.

The balanced-to-single-ended converter, with balanced input connections at the nodes N30 and N32 and an output connection to a node N33, includes:

a first current mirror amplifier with input connection at the node N30, with common connection to the B+ terminal T1, and with output connection at the node N33;

at second current mirror amplifier with input connection at the node N32, with common connection to the B+ terminal T1, and with output connection to a node N34; and a third current mirror amplifier with input connection at the node N34, with common connection to the ground terminal T2, and with output connection to the node N33. The first current mirror amplifier includes a PNP transistor Q109 with emitter degeneration resistor R104 as master transistor, a PNP in-substrate transistor Q110 with emitter load resistor R105 connected as an emitter-follower to provide Q109 direct-coupled collector-to-base feedback, and a PNP transistor Q111 with emitter degeneration resistor R106 as slave transistor. The second current mirror amplifier includes a PNP transistor Q112 with emitter degeneration resistor R107 as master transistor, a PNP in-substrate transistor Q113 with emitter load resistor R108 connected as an emitter-follower to provide Q113 direct-coupled collector-to-base feedback, and a PNP transistor Q114 with emitter degeneration resistor R109 as slave transistor. The third current mirror amplifier includes an NPN transistor Q115 with emitter degeneration resistor R110 as master transistor, an NPN transistor Q116 with emitter load resistor R111 connected as an emitter-follower to provide Q115 direct-coupled collector-to-base feedback, and an NPN transistor Q117 with emitter degeneration resistor R112 as slave transistor.

A resistor R113 connects from the emitter of Q98 to the node N33 for biasing the node N33 to substantially half B+ potential. The RC pi-section comprising a shunt capacitor C16, series resistor R114 and a shunt capacitor C16 provides a lowpass filter for separating the sound-IF signal at the node N33 from its image. The sound-IF signal as thus separated is applied to a voltage amplifier comprising the cascade connection of a common-collector-amplifier including an NPN transistor Q118, a common-base-amplifier including an NPN transistor Q119, and a common-collector-amplifier including an NPN transistor Q120; and the resulting amplified sound-IF signal is supplied to a terminal T9, for application to the 4.5 MHz bandpass filter 24 as shown in FIG. 1. More particularly, the emitter of the common-collector-amplifier transistor Q118 drives the emitter of the common-base-amplifier transistor Q119 via a resistor R115. The collector of the common-base-amplifier transistor Q119 connects to the B+ terminal T1 through a collector load resistor R116, to provide voltage gain equal to the quotient of the resistance of R116 divided by the resistance of R115. The emitter potential of the common-collector-amplifier transistor Q120 is divided by a resistive potential divider comprising resistors R117 and R118, lowpass filtered by the RC section comprising a series resistor R119 and shunt capacitor C18, and applied to the base of Q119, closing a negative feedback loop that determines the quiescent biasing of the common-base-amplifier transistor Q119. A small capacitor C19 shunts the base of the emitter-follower transistor Q120 to ground to further attenuate image components. A resistor R120 is connected to withdraw current to the ground terminal T2 from the emitter of Q119, so Q119 will not be cut-off by positive excursions of the sound-IF signal at the emitter of the emitter-follower transistor Q118.

FIG. 8 is a detailed schematic diagram of the overload AGC detector for the FIG. 4 second intermediate-frequency amplifier in the FIG. 1 apparatus. The FIG. 5 circuitry provides the FIG. 8 overload AGC detector balanced, amplified IF signals at the nodes N19 and N20. An RC section comprising a series resistor R121 and a shunt capacitor C20 lowpass filters the signal at node N19, extracting the direct bias potential thereof for application to the base of an NPN transistor Q121. Q121 is connected as a common-collector amplifier and functions as an emitter follower for supplying at its emitter a voltage offset by 1 $V_{BE}$ from the direct bias potential at its base. The emitter potential of Q121 is applied directly to the bases of NPN transistors Q122 and Q123 connected as common-collector amplifiers with emitter load resistors R122 and R123 respectively connecting their emitters to the ground terminal T2. A resistor R124 connects the emitter of Q121 to the emitter of Q122; and the 1 $V_{BE}$ offset potential between the base and emitter of Q122 causes current flow through resistor R124 supported by a substantially constant emitter flow from Q121 that keeps the source impedance offered at the emitter of Q121 reasonably low. The emitter potential of Q121 is applied as quiescent bias potential to the base of an NPN transistor Q124 via a resistor R125. A resistor R126 connects the emitter of Q124 to the emitter of Q122; and the 1 $V_{BE}$ quiescent potential appearing across resistor R126 causes current flow therethrough which is supported by a substantially constant emitter flow from Q124. The emitter potentials of Q122 and Q123 are applied to the bases of PNP transistors Q125 and Q126. Q125 and Q126 are a long-tailed pair having their emitters connected to a node N35 via a resistor R127 and via a direct connection without substantial impedance, respectively, and having their collectors connected to nodes N36 and N37, respectively. A tail resistor R128 connects the node N35 to the B+ terminal T1.

The collector loading for Q125 and Q126 is a balanced-to-single-ended converter, with balanced input connections at the nodes N36 and N37 and an output connection to a node N38, includes:

- a first current mirror amplifier with input connection at the node N36, with common connection to the ground terminal T2, and with output connection at a node N39;
- a second current mirror amplifier with input connection at the node N37, with common connection to the ground terminal T2, and with output connection to the node N38; and
- a third current mirror amplifier with input connection at the node N39, with common connection to the B+ terminal T1, and with output connection to the node N38. The first current mirror amplifier includes an NPN transistor Q127 with emitter degeneration resistor R129 and direct-coupled collector-to-base feedback connection as master transistor, and a an NPN transistor Q128 with emitter degeneration resistor R130 as slave transistor. The second current mirror amplifier comprises an NPN transistor Q129 with emitter degeneration resistor R131 and direct-coupled collector-to-base feedback connection as master transistor, and a an NPN transistor Q130 with emitter degeneration resistor R132 as slave transistor. The third current mirror amplifier includes a PNP transistor Q131 with emitter degeneration resistor R133 as master transistor, a PNP in-substrate transistor Q132 with emitter lead resistor R134 connected as an emitter-follower to provide Q131 direct-coupled collector-to-base feedback, and a PNP transistor Q133 with emitter degeneration resistor R135 as slave transistor.

The voltage at the node N35 biases the base of a common-collector-amplifier PNP transistor Q134, and the voltage appearing at the emitter of Q134 owing to emitter-follower action is applied via a resistor R136 to the node N38 to determine its quiescent bias potential. The potential at the node N38 is applied to the base of a common-collector-amplifier NPN transistor Q135, and the voltage appearing at the emitter of Q135 owing to emitter-follower action is applied via a resistor R137 to the terminal TS. The terminal T5 is shunted to ground by the off-chip capacitor 23 shown in FIG. 1.

An NPN transistor Q136 with collector connected to the B+ terminal T1 has the amplified IF signal superposed on a quiescent voltage the FIG. 5 circuitry provides at the node N19 applied to its base. Q136 has its emitter connected to a first plate of a capacitor C21, the second plate of which connects to the emitter of an NPN transistor Q137 arranged as a common-collector-amplifier for the amplified IF signal superposed on a quiescent voltage the FIG. 5 circuitry provides at the node N20. Q137 has an emitter load resistor R138 connected from its emitter to the ground terminal T2. During positive excursions of the node N19 voltage from its average-value axis, the emitter-follower action of Q136 charges the capacitor C21. The resistor R138 is of sufficiently high conductance that Q137 exhibits emitter-follower action during the concurrent negative excursions of the node N20 voltage from its average-value axis. Accordingly, the capacitor C21 is charged to a voltage equal to the peak-to-peak excursion of the balanced, amplified IF signals the FIG. 5 circuitry provides at the nodes N19 and N20. During the subsequent positive excursions of the node N20 voltage from its average-value axis, the voltage on the first plate of the capacitor C21 is boosted above the average-value axis of Q121 emitter voltage by a value one-and-a-half times the peak amplitude of the positive excursions of the node N20 voltage from its average-value axis, as the emitter of Q137 swings up in potential. This boost in the base voltage of Q124 is peak detected by charging a capacitor C22 connected between the emitter of Q124 and the ground terminal T2.

As the peak-to-peak amplitude of the balanced, amplified IF signals at the nodes N19 and N20 increases, the voltage detected across the capacitor C22 increases, reducing the conduction of Q126 respective to Q125. The balanced-to-single-ended converter for the collector currents of Q125 and Q126 responds to pull its output node N38 to more positive potential. The emitter-follower Q135, acting through the resistor R137, pulls up the potential at terminal T5. As previously noted in descriptions of FIGS. 4 and 5, sufficient rise in the potential at terminal T5 reduces the gains of the controlled-voltage-gain IF stages.

What is claimed:

1. In a television signal receiver, suitable for incorporation into a television set or video recorder, a combination comprising:
    a downconverter for responding to a selected television signal to supply first and second output signals each of which includes intermediate frequencies including a downconverted in-channel sound carrier and a downconverted picture carrier, said intermediate frequencies subject to at times including an adjacent-channel sound carrier downconverted from a non-selected adjacent-channel television signal, said downconverter including a local oscillator for generating oscillations at a frequency controlled in response to an automatic fine tuning signal;
    a first intermediate-frequency amplifier including respective tuning elements, said first intermediate-frequency amplifier generating as an output signal therefrom a first-IF-amplifier response to said first output signal supplied by said downconverter;
    a first adjacent-channel sound carrier trap included in the tuning elements of said first intermediate-frequency amplifier, for reducing said first-IF-amplifier response to adjacent-channel sound carrier, which first adjacent-channel sound carrier trap also reduces said first-IF-amplifier response for said downconverted picture carrier;
    an in-channel sound carrier trap included in said first intermediate-frequency amplifier tuning elements, for reducing said first-IF-amplifier response to in-channel sound carrier;
    a video detector for generating a composite video signal in response to said first-IF-amplifier response;
    a second intermediate-frequency amplifier including respective turning elements, said second intermediate-frequency amplifier generating as an output signal therefrom a second-IF-amplifier responsive to said second output signal supplied by said downconverter, said in-channel sound carrier not being trapped out from said second-IF-amplifier response;

a second adjacent-channel sound carrier trap included in the tuning elements of said second intermediate-frequency amplifier, for reducing said second-IF-amplifier response for said downconverted picture carrier, but reducing said second-IF-amplifier response for said downconverted picture carrier less than said first-IF-amplifier response is reduced for said downconverted picture carrier by said first adjacent-channel sound carrier trap;

means for generating a mixing signal in selective response to said second-IF-amplifier response, said mixing signal being generated responsive to the portion of said second-IF-amplifier response descriptive of picture carrier as translated to an intermediate frequency, rather than to other portions of said second-IF-amplifier response;

a first product detector for mixing said second-IF-amplifier response with said mixing signal, thereby to generate a first product signal comprising intercarrier-sound-IF response and its image;

a filter for separating said intercarrier-sound-IF response from its image, as applied to said intercarrier sound intermediate-frequency amplifier as an input signal thereof;

an intercarrier sound intermediate-frequency amplifier for amplifying said intercarrier-sound-IF response, thereby to supply an amplifier intercarrier-sound-IF signal;

a sound detector for generating a sound signal responsive to said amplified intercarrier-sound-IF signal; and an automatic fine tuning detector for generating said automatic fine tuning signal, responsive to sand second-IF-amplifier response.

2. A combination as set forth in claim 1 wherein said means for generating a mixing signal includes:

a limiting amplifier for generating a limiter response that switches between first and second levels responsive to average-axis crossings of said second-IF-amplifier response received by said limiting amplifier as its input signal; and a frequency-selective filter for selecting said picture carrier as translated to an intermediate frequency from said limiter response; and means for applying as said mixing signal, the picture carrier as translated to an intermediate frequency selected by said frequency-selective filter.

3. A combination as set forth in claim 2, wherein said frequency-selective filter for selecting said picture carrier as translated to an intermediate frequency from said limiter response has a quadrature shift for phase response.

4. A combination as set forth in claim 2, wherein said automatic fine tuning detector for generating said automatic fine tuning signal responsive to said second-IF-amplifier response comprises:

a second product detector for mixing said limiter response with said mixing signal, thereby to generate a second product signal; and a lowpass filter responding to said second product signal for supplying said automatic fine tuning signal.

5. A combination as set forth in claim 1, wherein said second intermediate-frequency amplifier has a frequency response characteristic that exhibits a reduced response to frequencies in a region between the regions of said down-converted sound carrier and said downconverted picture carrier.

6. A combination as set forth in claim 1, wherein said second intermediate-frequency amplifier has a frequency response characteristic that is substantially flat in a region between the regions of said down-converted sound carrier and said downconverted picture carrier.

7. A combination as set forth in claim 1, wherein said means for generating a mixing signal in selective response to said second-IF-amplifier response comprises:

a limiter responding to said second-IF-amplifier response, for supplying amplitude-limited signals of first and second phasings, said first and second phasings being opposite to each other;

a differential input-amplifier having respective first and second input terminals and having a respective first output terminal for supplying said mixing signal to said first product detector;

an inductive coil connected between the first and second input terminals of said differential input-amplifier; and first and second capacitors, each having respective first and second plates, the first plate of said first capacitor connected to receive said amplitude-limited signal of first phasing from said limiter, the second plate of said first capacitor connected to the first input terminal of said differential input-amplifier, the first plate of said second capacitor connected to receive said amplitude-limited signal of second phasing from said limiter, and the second plate of said second capacitor connected to the second input terminal of said differential input-amplifier.

8. A combination as set forth in claim 7, wherein said automatic fine tuning detector comprises:

a second product detector for mixing amplitude-limited signal of one of said first and second phasings with mixing signal from a second output terminal of said differential input-amplifier, thereby to generate a second product signal; and a lowpass filter responding to said second product signal for supplying said automatic fine tuning signal.

9. In a television signal receiver, suitable for incorporation into a television set or video recorder, a combination comprising:

a downconverter for responding to a selected television signal to supply first and second output signal which includes intermediate frequencies including a downconverted in-channel sound carrier and a downconverted picture carrier, said intermediate frequencies subject to at times including an adjacent-channel sound carrier downconverted from a non-selected adjacent-channel television signal, said downconverter including a local oscillator for generating oscillations at a frequency controlled in response to an automatic fine tuning signal;

a first intermediate-frequency amplifier including respective tuning elements, said first intermediate-frequency amplifier generating as an output signal therefrom a first-IF-amplifier response to said first output signal supplied by said downconverter;

a first adjacent-channel sound carrier trap included in said first intermediate-frequency amplifier tuning elements, for reducing said first-IF-amplifier response to adjacent-channel sound carrier, which first adjacent-channel sound carrier trap also reduces said first-IF-amplifier response for said downconverted picture carrier;

an in-channel sound carrier trap included in the tuning elements of said first intermediate-frequency amplifier, for reducing said first-IF-amplifier responses to in-channel sound carrier;

a video detector for generating a composite video signal in response to said first-IF-amplifier response;

a second intermediate-frequency amplifier including respective tuning elements said second intermediate-frequency amplifier generating as an output signal therefrom a second-IF-amplifier response to said second output signal supplied by said downconverter, said in-channel sound carrier not being trapped out from said second-IF-amplifier response, the respective tuning elements of said second intermediate-frequency amplifier being such as to provide it with a frequency response characteristic that is substantially flat in a region between the regions of said downconverted sound carrier and said downconverted picture carrier;

a second adjacent-channel sound carrier trap included in the tuning elements of said second intermediate-frequency amplifier, for reducing said Second-IF-amplifier response for said downconverted picture carrier, but reducing said second-IF-amplifier response for said downconverted picture carrier less than said first-IF-amplifier response is reduced for said downconverted picture carrier by said first adjacent-channel sound carrier trap;

intercarrier detection circuitry for detecting from said Second-IF-amplifier response, an intercarrier-sound-IF response;

an intercarrier sound intermediate-frequency amplifier for amplifying said intercarrier-sound-IF response, thereby to supply an amplified intercarrier-sound-IF signal;

a sound detector for generating a sound signal responsive to said amplified intercarrier-sound-IF signal; and an automatic fine tuning detector for generating said automatic fine tuning signal, responsive to said second-IF-amplifier response.

10. In a television signal receiver, suitable for incorporation into a television set or video recorder, a combination comprising:

a downconverter for responding to a selected television signal to supply an output signal which includes intermediate frequencies including a downconverted in-channel sound carrier and a downconverted picture carrier, said intermediate frequencies at times including an adjacent-channel sound carrier downconverted from a non-selected adjacent-channel television signal, said downconverter including a local oscillator for generating oscillations at a frequency controlled in response to an automatic fine tuning signal;

an intermediate-frequency amplifier including tuning elements, for generating an IF-amplifier response to the output signal of said downconverter, said IF-amplifier response including response to said in-channel sound carrier;

an adjacent-channel sound carrier trap included in said tuning elements, for reducing said IF-amplifier response to adjacent-channel sound carrier;

a limiter responding to said IF-amplifier response, for supplying amplitude-limited signals of first and second phasings, said first and second phasings being opposite to each other;

a differential input-amplifier having respective first and second input terminals and having respective first and second output terminals;

an inductive coil connected between the first and second input terminals of said differential input-amplifier;

first and second capacitors, each having respective first and second plates, the first plate of said first capacitor connected to receive said amplitude-limited signal of first phasing from said limiter, the second plate of said first capacitor connected to the first input terminal of said differential input-amplifier, the first plate of said second capacitor connected to receive said amplitude-limited signal of second phasing from said limiter, and the second plate of said second capacitor connected to the second input terminal of said differential input-amplifier;

a first product detector for mixing said IF-amplifier response with signal from the first output terminal of said differential input-amplifier, thereby to generate a first product signal comprising intercarrier-sound-IF response and its image;

a filter for separating said intercarrier-sound-IF response from its image, as applied to an intercarrier sound intermediate-frequency amplifier as an input signal thereof;

an intercarrier sound intermediate-frequency amplifier for amplifying said intercarrier-sound-IF response, thereby to supply an amplified intercarrier-sound-IF signal;

a sound detector for generating a sound signal responsive to said amplified intercarrier-sound-IF signal;

a second product detector for mixing amplitude-limited signal of one of said first and second phasings with signal from the second output terminal of said differential input-amplifier, thereby to generate a second product signal; and a lowpass filter responding to said second product signal for supplying said automatic fine tuning signal.

* * * * *